United States Patent

Grasso et al.

[11] Patent Number: 5,204,923
[45] Date of Patent: Apr. 20, 1993

[54] UNIT FOR AMPLIFYING LIGHT SIGNALS IN OPTICAL FIBER TRANSMISSION LINES

[75] Inventors: Giorgio Grasso, Monza; Aldo Righetti, Milan, both of Italy

[73] Assignee: Pirelli Cavi S.p.A., Milan, Italy

[21] Appl. No.: 839,056

[22] Filed: Feb. 18, 1992

Related U.S. Application Data

[63] Continuation of Ser. No. 552,918, Jul. 16, 1990.

[30] Foreign Application Priority Data

Jul. 17, 1989 [IT] Italy .............................. 21207 A/89

[51] Int. Cl.$^5$ .......................................... H01L 15/00
[52] U.S. Cl. ...................................... 385/24; 385/32; 385/42; 359/156; 359/195
[58] Field of Search ............... 350/96.15, 96.16, 96.29, 350/96.30; 455/601, 602, 610, 612; 385/24, 27, 31, 32, 39, 42; 359/154, 156, 173, 174, 179, 188, 195

[56] References Cited

U.S. PATENT DOCUMENTS

| | | | |
|---|---|---|---|
| 4,168,427 | 9/1979 | Hubbard | 359/152 |
| 4,596,048 | 6/1986 | Dunki-Jacobs | 455/602 |
| 4,704,741 | 11/1987 | Shikada | 455/612 X |
| 4,879,763 | 11/1989 | Wood | 359/168 |
| 4,899,043 | 2/1990 | Mochizuki et al. | 455/602 X |
| 4,900,917 | 2/1990 | Dixon et al. | 455/601 X |
| 4,947,134 | 8/1990 | Olsson | 455/602 X |
| 5,007,698 | 4/1991 | Sasaki et al. | 350/96.15 |

FOREIGN PATENT DOCUMENTS

| | | |
|---|---|---|
| 0112090 | 6/1984 | European Pat. Off. . |
| CS221382 | 9/1982 | U.S.S.R. . |
| 8607221 | 4/1986 | World Int. Prop. O. . |

OTHER PUBLICATIONS

Electronics Letters, vol. 24, No. 1, Jan. 7, 1988; pp. 36-38, Hitchin-Herts, GB; N. A. Olsson et al.: "400 Mbits/s, 372 km Coherent Transmission Experiment Using In-Line Optical Amplifiers".
Proceedings of the 15th European Conference on Optical Communications, vol. 3, Sep. 10th-14th, 1989, Post--Deadline Papers, pp. 42-45, Gothenburg, S. E.; A. Righetti et al.: "An 11 Gbit/sec, 260 km Transmission etc.".
Electronics Letters, vol. 25, No. 9, Apr. 27, 1989, pp. 594-595, Stevenage, Herts GB; K. Inoue et al., "Mutual Signal Gain . . . 1.54 μm Wavelength".
Patent Abstracts of Japan, vol. 13, No. 8 (E-702) [3356] Jan. 10, 1989; p. 72 E 702; and JP-A-63 219 186 (Nippon Telegraph & Telephone Corp.).
Patent Abstracts of Japan, vol. 2, No. 33 (E-19), Mar. 6, 1978, p. 12531 E 77; and JP-A-52 155 901 (Nippon Denshin Denwa Kosha) Dec. 24, 1977.
Fian Proceedings, Moscow vol. 172, pp. 79, 80, 110.

*Primary Examiner*—Akm E. Ullah
*Attorney, Agent, or Firm*—Brooks Haidt Haffner & Delahunty

[57] ABSTRACT

A unit for amplifying light signals in optical fiber transmission lines includes a fiber optical amplifier to which light signals are transmitted through an input optical fiber line, and from which the signals, after having been amplified, are introduced into an output optical fiber line. First and second optical insulators are interposed between the fiber optical amplifier and the input and output lines to prevent the transmission of optical noise signals from the input and output lines, respectively, to the amplifier.

5 Claims, 1 Drawing Sheet

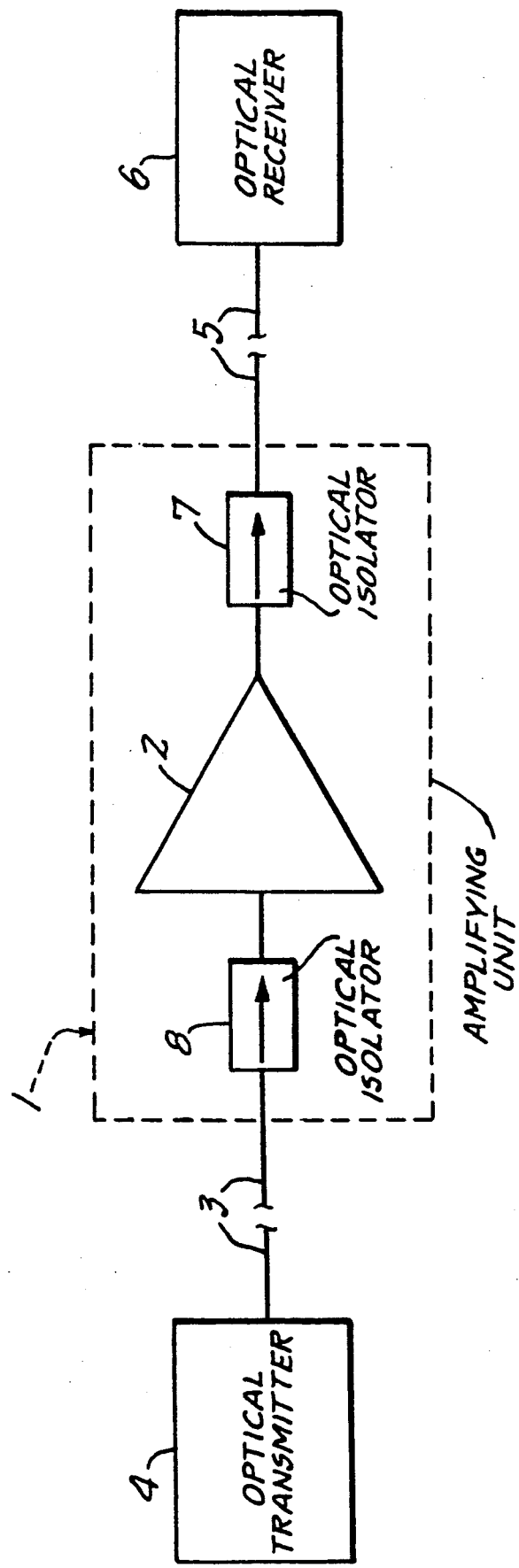

UNIT FOR AMPLIFYING LIGHT SIGNALS IN OPTICAL FIBER TRANSMISSION LINES

This application is a continuation, of application Ser. No. 07/552,918, filed Jul. 16, 1990.

BACKGROUND OF THE INVENTION

1. Field Of The Invention

The present invention generally concerns a unit for amplifying light signals in optical fiber transmission lines, and, more specifically, to such a unit which reduces interference and noise in such lines and which is connected between a pair of optical fibers.

2. Description Of The Prior Art

As known, in the optical fiber telecommunications field, owing to the unavoidable losses of light occurring inside optical fibers, a gradual attenuation of the signal always takes place along the path of the optical fibers.

For this reason, when signals have to be transmitted long-distances, it is necessary to use one or more amplifying units which are interposed along the path of the optical fibers at intervals of pre-fixed length.

A type of amplifying unit that at present is in widespread use provides for the use of an optical fiber amplifier which in operation is connected to the optical fibers so as to define, along the path of the latter, an input line through which the signals of light are transmitted to the amplifier itself, as well as an output line through which the amplified signals of light are transmitted in the direction of an optical receiver.

At the present state of the technique, the use of these optical fiber amplifiers gives rise to some drawbacks, deriving mainly from the fact that the amplifier receives not only and exclusively the useful signal to be amplified, but also different noise signals which are consequently amplified and introduced again into the output line.

It is found that a certain number of these noise signals come from the output line and are caused by a phenhomena of diffusion of light unavoidably arising inside the optical fibers.

More precisely, a part of the light forming the amplified signals gets lost as a result of a phenomenon of diffusion arisinq inside the optical fibers.

A part of the back-diffused light returns to the amplifiers and, therefore, is again amplified and introduced into the output line.

Moreover, it is to be considered that the amplifier, owing to its intrinsic nature, emits a certain quantity of noise signals which are introduced either into the input line or into the output line.

Owing to the above phenomena of diffusion, these noise signals partly come back to the amplifier where they mix with the useful signals which it is desired be transmitted.

As it can be understood from the above, the entry of noise signals into the amplifier and their consequent amplification result in interferences and beat phenomena that, for sufficiently high values (>15 dB) of gain of the amplifier, originate an "interferometric noise" of an amplitude greater than the known noise produced by the amplifier.

The above problem results in an undesired reduction of the signal-to-noise ratio between the useful signal and the noise downstream of the amplifier itself. This reduction in the signal/noise ratio tends to increase by increases in the gain of the fiber optical amplifier, as well as by increasing the number of amplifiers arranged along the path of the fibers.

In this situation it is extremely difficult to have the useful signal sufficiently clear when it reaches a receiver placed at a long distance from the source of the signal itself.

From Japanese patents 52-155901 and 63-219186 and from "ELECTRONICS LETTERS", vol. 24, no. 1, Jan. 7, 1988, pages 36–38, it is known that in a laser or in an optical semiconductor amplifier there is the risk of instability and generation of oscillations due to the reflections at the amplifier ends.

In the above patents and article, in order to eliminate these reflections, it is taught to couple an optical isolator to the semiconductor laser, which prevents the light reflected by the coupling surfaces between the line fibers and these devices from reaching the lasers themselves.

In an active-fiber amplifier no interface surfaces are present between the line fibers and the amplifier because the line fibers are directly welded to the amplifier's active fiber. Therefore, the reflection phenomena are not generally expected.

It has, however, been discovered that in an active-fiber amplifier, in the absence of means for limiting reflections towards the active fiber, it is impossible to reach high amplification gain due to the occurrence of noise of the interferometric type as a result of beats between the direct and reflected signals in the line fibers themselves and in any event directed towards the active fiber. The presence of interferometric noise is of little importance in a semiconductor amplifier which has low gains and small construction sizes, whereas it becomes particularly important in an active-fiber amplifier capable of reaching very high gains and having an active fiber of considerable length generally in the range of some tens of meters, much greater than the coherence distance of the signal generating laser.

In an optical fiber amplifier the problem arises, therefore, of protecting the amplifying fiber against such noise sources and keeping the reflections towards the active fiber itself below critical values so as not to jeopardize the transmission quality, while maintaining high values of amplification gain.

SUMMARY OF THE INVENTION

The main object of the present invention is to solve the problems of the known technique, by realising an amplifying unit formed in such a way as to considerably prevent the entry of noise signals into the fiber optical amplifier.

This aim and other ones that will be better apparent from the present description, are substantially achieved by means of a unit for amplifying light signals in optical fiber transmission lines, comprising first isolator means for unidirectional light transmission interposed between said amplifier and the output optical fiber line to prevent the transmission of optical noise signals from said output line to the amplifier and second isolator means for unidirectional light transmission between the amplifier and the input line to prevent the transmission of noise signals from the amplifier to said input line.

BRIEF DESCRIPTION OF THE DRAWINGS

Further characteristics and advantages will better appear from the detailed description of a preferred but not exclusive embodiment of a unit for amplifying signals of light in optical fiber transmission lines, according to the present invention. Said description will be made hereinafter with reference to the attached sheet of drawing, supplied only by way of example, which in the single FIGURE shows a block diagram of an amplifying unit forming the object of the present invention arranged to operate along an optical fiber transmission line.

DESCRIPTION OF THE PREFERRED EMBODIMENT

With reference to the FIGURE, reference numeral 1 generally indicates a unit for amplifying signals of light in optical fiber transmission lines according to the invention.

The amplifying unit 1 includes conventionally an optical fiber amplifier 2 arranged to be connected in use to at least an input optical fiber line 3 through which light signals emitted for instance by an optical transmitter 4 or, alternatively, coming from an amplifying unit like that shown and placed upstream of the same, are transmitted.

The amplifier 2 is also connected to an output optical fiber line 5 which convey the amplified light signal to an optical receiver 6 or, alternatively, to another amplifying unit like the shown one.

In accordance with the present invention, the amplifying unit 1 also includes first isolator means 7 for unidirectional light transmission interposed between the fiber optical amplifier 2 and the output optical fiber line 5 to prevent the transmission of optical noise signals from the output line to the amplifier. Moreover, second isolator means 8 for light transmission are interposed between the fiber optical amplifier 2 and the input 3 to prevent the transmission of noise signals from the amplifier 2 to the input line.

Preferably, the isolator means 7, 8 for unidirectional light transmission comprise at least a first optical isolator and at least a second optical isolator, respectively, both isolators having a low reflectivity. It is provided that the reflectivity of these optical isolators 7, 8, known per se, is lower by at least 10 dB with respect to the reflectivity due to Rayleigh scattering in the optical fibers forming the input 3 and output 5 lines.

The operation of the amplifying unit of the present invention will now be described.

In a known way, the amplifier 2 receives the light signals coming from the input line 3 and transmits the amplified signals in the direction of the output line 5.

Besides the aforementioned optical signals, the amplifier 2 also transmits, in a known way, its own noise signals, which tend to be introduced both into the input line 3 and into the output line 5.

Advantageously, the presence of the second optical isolator 8 immediately upstream of the amplifier 2 does not allow the entry of noise signals into the input line 3.

Absent such optical isolator 8, the entry of the amplifier noise signals into the input line 3 would originate, owing to the phenomena of diffusion arising inside the optical fibers, further noise signals, a part of which would again reach the amplifier 2 creating interferences of beats with the useful optical signals, i.e. those transmitted by the optical transmitter 4.

Advantageously, the presence of the first optical isolator 7 immediately downstream of the amplifier 2 additionally avoids noise signals reaching the amplifier 2 produced along the output line 5 as a consequence of the phenomena of diffusion of light arising inside the optical fibers. Absent the first optical isolator 7, these noise signals would be amplified and again introduced into the output line 5 together with the amplified useful signal, thus originating undesired interferences and/or beat phenomena.

From the above it is understood that the only signals that will reach the output line 5 are the amplified useful signals, together with the small noise signal, negligible among other things, produced by the amplifier 2.

The present invention achieves the objects of the invention. In fact, as demonstrated above, due to the presence of the optical isolators immediately upstream and downstream of the amplifier 2, the amplifying unit 1 forming the object of the present invention permits noticeable reduction, in comparison with known techniques, in the entry of noise signals into the output line 5 of the amplifier 2.

This invention increases the useful gain of the amplifier, as well as an improved transmission of the optical signals from a transmitter to a receiver remotely placed at a long distance one from the other.

While a particular embodiment of the present invention has been illustrated and described herein, changes and modifications apparent to those skilled in the art may be made therein and thereto, but are included within the scope of the appended claims.

We claim:

1. An optical signal transmission system for transmitting optical signals at a predetermined wavelength from a transmitter to a receiver of such optical signals, at long distance from said transmitter, said system comprising:

a transmitter of optical signals at said predetermined wavelength;

an active fiber amplifier for amplifying signals at said predetermined wavelength and having an input and an output and comprising an active fiber having a predetermined length connected between said amplifier input and output, said amplifier having a gain greater than 15 dB;

a first optical transmission line fiber having a first line fiber input connected to said transmitter of optical signals at said predetermined wavelength and a first line fiber output, said first optical transmission line fiber having a length between said first line fiber input and said first line fiber output greater than said predetermined length of said active fiber and such that optical signals at said predetermined wavelength applied to said first line fiber input are significantly attenuated in travelling from said first line fiber input to said first line fiber output and having a length such that a significant portion of optical signals applied to said first line fiber output are reflected back toward said first line fiber output, due to Rayleigh scattering;

a receiver of optical signals at said predetermined wavelength;

a second optical transmission line fiber having a second line fiber input and having a second line fiber output connected to said receiver of optical signals at said predetermined wavelength, said second optical transmission line fiber having a length greater than said predetermined length of said active fiber and such that a significant portion of optical signals applied to said second line fiber input are reflected back toward said second line fiber input, due to Rayleigh scattering;

first interconnecting means interconnecting said first line fiber output with said input of said active fiber amplifier comprising a first optical isolator optically connected to said first line fiber output and to said input of said active fiber amplifier for supplying optical signals at said first line fiber output to said input of said active fiber amplifier, said first optical isolator being unidirectional for transmitting optical signals substantially only from said first line fiber output to said input of said active fiber amplifier, and said first interconnecting means having a reflectivity lower than the reflectivity due to Rayleigh scattering of said first optical transmission line fiber;

second interconnecting means interconnecting said output of said active fiber amplifier with said second line fiber input, comprising a second optical isolator optically connected to said output of said active fiber amplifier and to said second line fiber input, for supplying optical signals at said output of said active fiber amplifier to said second line fiber input, said second optical isolator being unidirectional for transmitting optical signals substantially only from said output of said active fiber amplifier to said second line fiber input, and said second interconnecting means having a reflectivity lower than the reflectivity due to Rayleigh scattering of said second optical transmission line fiber, whereby reflected optical signals, including optical signals reflected in said first optical transmission line fiber and in said second optical transmission line fiber due to Rayleigh's scattering are substantially prevented from reaching said active fiber.

2. System as set forth in claim 1 wherein the reflectivity of said first optical isolator and said second optical isolator is lower than said reflectivity due to Rayleigh scattering by 10 dB.

3. An optical transmission system as set forth in claim 1 wherein said active fiber has a predetermined length and each of said first optical transmission line fiber and said second optical transmission line fiber is long relative to said predetermined length of said active fiber.

4. An optical transmission system as set forth in claim 3 wherein said predetermined length of said active fiber is greater than the coherence distance of said optical signals at said predetermined wavelength.

5. An optical signal transmission system for transmitting optical signals at a predetermined wavelength from a transmitter to a receiver of such optical signals at long distance from said transmitter, said system comprising:

a transmitter of optical signals at said predetermined wavelength;

an active fiber amplifier for amplifying signals at said predetermined wavelength and having an input and an output and comprising an active fiber having a predetermined length connected to said amplifier input and output, said amplifier having a gain greater than 15 dB;

a receiver of optical signals at said predetermined wavelength;

a first optical transmission line fiber having a first line fiber input at one end thereof connected to said transmitter of optical signals and a first line fiber output at the other end thereof;

first interconnecting means interconnecting said first line fiber output with said active fiber amplifier at said input of the latter;

a second optical transmission line fiber having a second line fiber output at one end thereof connected to said receiver of optical signals and having a second line fiber input at the other end thereof; and second interconnecting means interconnecting said amplifier at the output of the latter with said second line fiber input;

at least one of said first optical transmission line fiber and said second optical transmission line fiber having a length between the input and output thereof greater than said predetermined length of said active fiber and such that optical signals applied to the input thereof are significantly attenuated in travelling from the input to the output thereof and having a length such that a significant portion of optical signals at said predetermined wavelength applied to the other end of said one of said first optical transmission line fiber and said second optical transmission line fiber are reflected back toward said active fiber amplifier due to Rayleigh scattering and the one of said first interconnecting means and said second interconnecting means interconnecting said one of said first optical transmission line fiber and said second optical transmission line fiber with said active fiber amplifier comprising a unidirectional optical isolator which substantially prevents optical signals due to Rayleigh scattering from entering said amplifier while transmitting optical signals at said predetermined wavelength and said one of said first interconnecting means and said second interconnecting means having a reflectivity lower than the reflectivity due to Rayleigh scattering in said one of said first optical transmission line fiber and said second optical transmission line fiber.

* * * * *